UNITED STATES PATENT OFFICE.

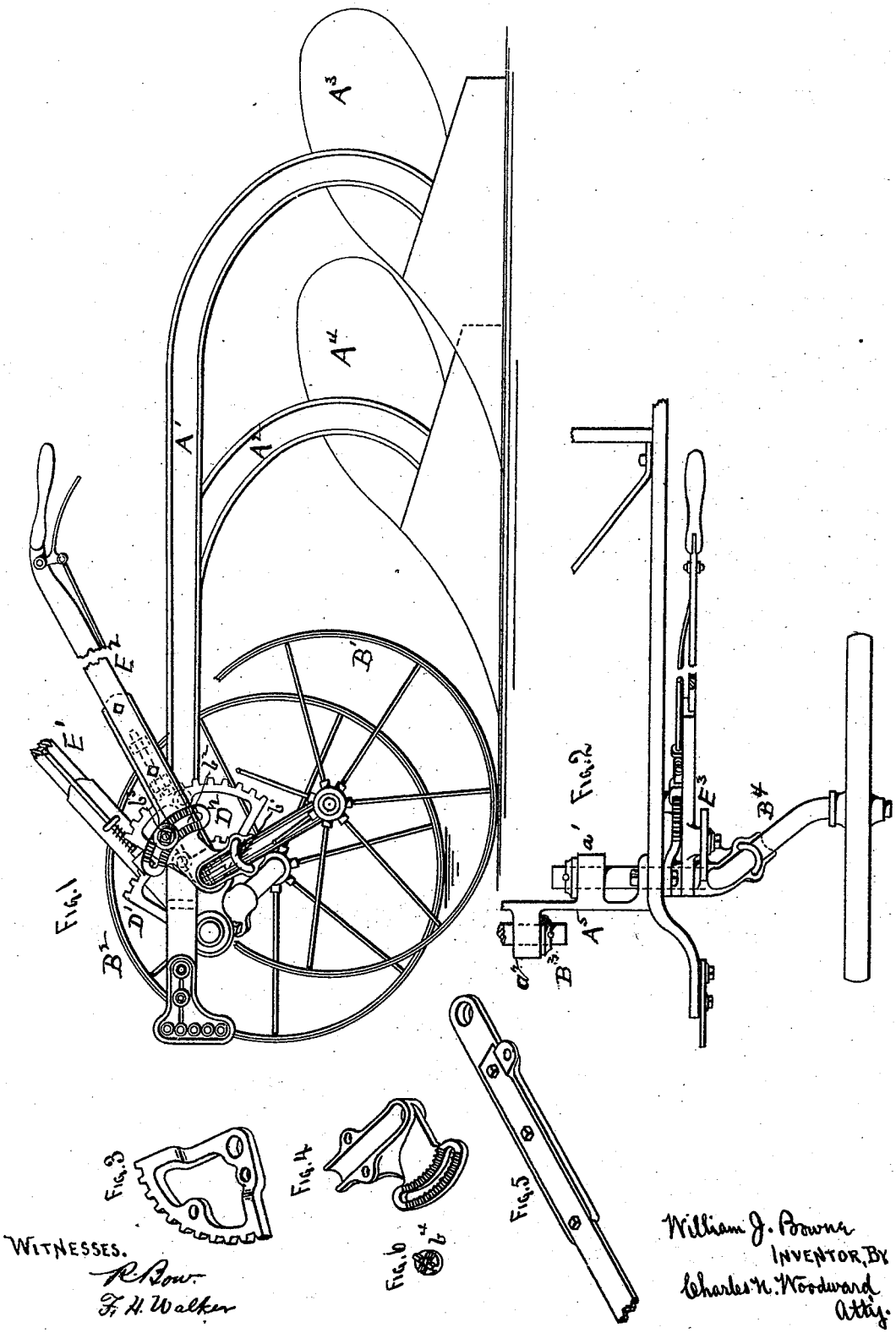

WILLIAM J. BROWNE, OF GLADSTONE, MINNESOTA.

GANG OR SULKY PLOW.

SPECIFICATION forming part of Letters Patent No. 501,180, dated July 11, 1893.

Application filed August 30, 1892. Serial No. 444,543. (No model.)

*To all whom it may concern:*

Be it known that I, WILLIAM J. BROWNE, a citizen of the United States, residing at Gladstone, in the county of Ramsey and State of Minnesota, have invented certain new and useful Improvements in Gang or Sulky Plows, of which the following is a specification.

This invention relates to gang or sulky plows, and consists in the construction, combination, and arrangement of parts, as hereinafter shown and described, and specifically pointed out in the claim.

In gang or sulky plows, as ordinarily constructed, with carrying wheels for the forward ends of the beams, provision is made for elevating or depressing said forward ends, by means of levers acting upon the axles of the carrying wheels. When thus arranged any change of the position of the wheels also correspondingly changes the angles of the levers. The levers are adjusted to extend backward and upward to the required distance to be convenient to the hand of the operator, and if the extent of the elevation and depression of the shares does not exceed the usual limit, say from two to four inches, the throw of the handles of the levers will not be great enough to inconvenience the operator, but if a greater depth is to be cut, the extra depression which the extra depth renders it necessary to give the landside carrying wheel elevates the handle of the landside lever to a corresponding degree and places its handle at an inconvenient point for the operator. To obviate this difficulty is the object of my invention, which I accomplish by so arranging the lever for actuating the guiding or carrying wheel of gang or sulky plows that it can be readily and quickly adjusted to change the angle of the connection to the axle, whereby the handle of the lever may be retained in the same relative point of elevation, regardless of the depth to which the plows are set to cut. In the drawings I have shown an approved method of accomplishing this result.

Figure 1 represents a side elevation of a gang plow with my improvement attached thereto. Fig. 2 is a plan view of a portion of one of the beams and one of the bearing wheels and its connections. Figs. 3, 4, 5 and 6 are perspective views of four of the parts, detached, which form the attachments to the axle by which the desired results are accomplished.

The invention is equally applicable to sulky plows, but I have shown it applied to a gang plow only, as being sufficient to illustrate the invention.

$A'$ $A^2$ represent the coupled beams, and $A^3$ $A^4$ the mold boards, of a gang plow of the usual construction.

$B'$ represents the forward bearing wheels, on the landside side, and $B^2$ represents the forward bearing wheel on the furrow side, each being pivotally connected to the cross frame $A^5$ of the beams $A'$ $A^2$ by crank axles $B^3$ $B^4$, all of these parts being of the usual construction. The inner upper ends of the axles $B^3$ $B^4$ are journaled in bearings $a'$ $a^2$ on the cross frame $A^5$, and are also supported in the lower portions of the toothed segments $D'$ $D^2$ by which the levers are held, the segments being bolted to the beams, as shown, and thereby performing the twofold function of segments to hold the levers at any desired point, and as outer bearings for the upper horizontal portions of the bent axles. The lever $E'$ on the furrow side of the plow is connected to the axle $B^3$ so as to oscillate it in its bearings when moved upward and downward, being held at any required point of elevation by a spring pawl fitting into one of the teeth in the segment $D'$ in the ordinary manner. The lever $E^2$ on the landside is journaled loosely around the axle $B^4$ next to the segment $D^2$, while a plate or casting $E^3$ embraces the axle next to the lever $E^2$ and is secured firmly to the axle by a clamp or clip $b'$, and is provided with a curved slot $b^2$ through which a bolt $b^3$ passes to secure the plate $E^3$ to the lever $E^2$. By means of this slot and bolt connection the lever may be adjusted upon the plate $E^3$ so as to change the angle between the lever and axle to any desired extent. The surface of the plate $E^3$ adjacent to the slot $b^2$ and also the washer $b^4$, (see Figs. 4 and 5) are serrated, so that when the bolt is "set up" the lever and plate will be firmly gripped, and no danger of slipping will exist. By this means if it is desired to give the plow a deeper cut, it can be readily and quickly accomplished by simply elevating the landside wheel, and then by adjusting the lever $E^2$ upon the plate $E^3$ the handle may be set to adapt it to the convenience of the operator, or as it was before the change of cut was made.

Having thus described my invention, what I claim as new is—

In a sulky plow, a bent semi-axle journaled by its upper horizontal portion to the beams and having the landside wheel journaled on its lower horizontal portion, a bracket $E^3$ attached rigidly to the axle at the point of its upper bend and formed with slotted segment $b^3$, a lever $E^2$ pivoted loosely upon said axle and connected adjustably to said bracket by said slotted segment, a bracket $D^2$ attached to the beams of said plow and having a toothed segment with which said lever is adapted to be engaged, substantially as and for the purpose set forth.

In testimony whereof I have hereunto set my hand in the presence of two subscribing witnesses.

WILLIAM J. BROWNE.

Witnesses:
C. N. WOODWARD,
H. S. WEBSTER.